UNITED STATES PATENT OFFICE.

EDWARD CHARLES CORTIS STANFORD, OF DALMUIR, COUNTY OF DUMBARTON, SCOTLAND.

ALGIN AND OTHER USEFUL PRODUCTS.

SPECIFICATION forming part of Letters Patent No. 349,760, dated September 28, 1886.

Application filed January 2, 1886. Serial No. 187,416. (No specimens.) Patented in England October 11, 1884, No. 13,433.

*To all whom it may concern:*

Be it known that I, EDWARD CHARLES CORTIS STANFORD, of Dalmuir, in the county of Dumbarton, Scotland, manufacturing chemist, have invented a new and useful Improvement in the Manufacture of Algin and other Useful Products from Sea-Weeds, of which the following is a full, clear, and exact description, and for which I have obtained Letters Patent in Great Britain, dated October 11, 1884, No. 13,433.

My invention relates to the manufacture of algin and other useful products from sea-weed.

In carrying out my invention I take the fresh or more or less dried sea-weed and treat it directly with carbonate of soda in dilute solution, and steam or boil the mixture for about six hours, after which I separate the solution by means of a filter or filter-press in which the cellulose is retained as a residual cake. This cellulose having certain peculiarities, may be termed "algulose," to distinguish it from ordinary cellulose. The clear solution is next treated with dilute sulphuric acid, and the crude alginic acid thereby obtained as a precipitate, is washed and pressed into cakes, either in a suitably-constructed filter-press or in an ordinary wooden screw or other press. The cakes of insoluble algin or crude alginic acid thus obtained become air-dry by simply being stored in a warm room. The solution filtered off from the alginic acid is neutralized with dolly or limestone dust or other cheap form of alkaline earth or alkali, and the sulphate-of-lime precipitate allowed to settle. The clear solution is evaporated to a density at which the sulphate of soda crystallizes out as Glauber's salt, which are separated, washed, and dried in a hydro-extractor. Dilute hydrochloric acid may be used instead of sulphuric acid, in which case chloride of sodium is deposited on evaporation and is fished out. The mother-liquid is next evaporated to dryness, and the residue is carbonized, to form what is called "kelp extract" or "kelp substitute," and is sold for the preparation of iodine and potash salts as a substitute for the kelp of commerce, compared with which, as it contains nearly double the amount of salts and more than double the amount of iodine, it is worth more than double the ordinary market price. The mother-liquor contains dextrine, mucilage, and sugar, all of which are sacrificed by the carbonization; but these may be separated by dialysis, or by converting them into alcohol and distilling off this product; or they may be recovered by other known means. The iodine and bromine also may be precipitated directly by adding a copper salt, or in any other known way. The iodine may be removed by setting it free by adding nitro-sulphuric acid or chlorine and filtering it through charcoal or by distilling it off, or by other known process, if it be desired to remove it first; or the sea-weed may at the outset be treated with chlorine to bleach it, the iodine present being converted into iodate.

The following modifications of the process hereinbefore described may also be used. The acid liquor from which the insoluble algin or alginic acid has been precipitated by sulphuric acid is neutralized with native magnesite or carbonate of magnesia, and the magnesia is afterward precipitated as carbonate by carbonate of soda, in which way the magnesia always contained in the soluble salts of sea-weed is recovered and utilized; or, when hydrochloric acid has been used to precipitate the algin or alginic acid, the solution may be neutralized with magnesite, in which case, on boiling the solution, the chloride, bromide, and iodide of magnesium dissociate, the magnesia being deposited and the hydrochloric, hydrobromic, and hydriodic acids are distilled off. In either case the magnesia can be used over again. By another modification the solution expressed from the cellulose or algulose and containing the algin may be treated with chloride of calcium, whereupon alginate of calcium will be precipitated, and from this compound soluble algin or alginate of soda (or sodium alginate) can be obtained by decomposing it with carbonate of soda, or the calcium may be dissolved out with hydrochloric acid, leaving the crude alginic acid, lime-water, or baryta-water; or a calcium or barium salt may be employed in the same way with similar results; or the solution of algin may be precipitated with aluminium chloride or sulphate made by dissolving bauxite in hydrochloric or sulphuric acid. Aluminium alginate is thus obtained, from which compound aluminium chloride or sulphate can be regenerated by adding hydrochloric or sulphuric acid, crude alginic acid or insoluble algin being left. Salts of metals—such as iron, copper, or lead—may also be employed in the same way, the alginic acid being easily separated and the metal recovered in each case. The crude insoluble algin or alginic acid obtained by any of the processes hereinbefore described, or otherwise, can be dissolved at once in a solution of carbonate of soda, thus forming one variety of soluble algin or alginate of soda. If this is required colorless, or nearly so, the crude alginic acid is first bleached by means of chlorine or of a hypochlorite-of-lime soda or magnesia in the presence of a weak acid, if necessary. The solution is evaporated on shallow dishes over which currents of air are passed, or on a rotating cylinder heated internally by steam, whereby it is obtained in transparent sheets resembling gelatine, and forms the soluble algin or alginate of soda. The alginates of potash and ammonia can be made in a similar way. These are soluble, and, like the alginate of soda, can be used for stiffening woven fabrics and for similar purposes. Calcined magnesia or carbonate of magnesia may also be combined with alginic acid, the two separately insoluble substances forming a soluble alginate of magnesium, which is useful as a mordant, because of the ease with which either the base or the combined alginic acid can be rendered insoluble. The ordinary soluble algin or alginate of soda is, also, by my present invention used for the preparation of insoluble alginates by double decomposition. By adding sulphate of copper to the dissolved algin the blue alginate of copper is precipitated. This precipitate is soluble in ammonia and becomes insoluble on drying, so that it can be used for waterproofing canvas or paper. The following alginates have similar properties, and may be formed in the same way—namely, the alginates of zinc, aluminium, cadmium, chromium, cobalt, nickel, uranium, and platinum. Aluminium alginate prepared by decomposing the alginate of soda by aluminium chloride or sulphate is soluble in caustic soda, and the solution, which may be made quite neutral, is a valuable stiffening and dressing material for woven fabrics. The alginates of calcium, barium, and strontium are also made by decomposing the chlorides with alginate of soda, and form useful white compounds, resembling bone, which, when dry, can be turned and polished, and which may have coloring-matters combined with them. The alginate of iron, made by decomposing perchloride of iron by alginate of soda, is a brown compound, resembling horn when dry, and is capable of replacing it. The alginates of copper, cobalt, nickel, and chromium are similar insoluble substances having characteristic colors.

My present invention also comprises the combination of alginate of soda, or, preferably, alginate of ammonia, with shellac dissolved in ammonia by mixing the two together. When dried, the compound formed is a tough flexible substance resembling gutta-percha, and is capable of replacing it in some of its applications. It can be rendered quite insoluble in water. In a similar way any resin—such as copal—which is soluble in ammonia may be combined by mixing with the alginate of ammonia. I also combine alginate of soda or alginic acid with silicate of soda or of potash, and thereby form a useful translucent compound, or a kind of flexible glass, which, when dried, is insoluble in water. I also use soluble alginates for completely precipitating iron and alumina from solution and as dung substitutes in Turkey-red dyeing, and generally as mordants, for which they are well suited on account of their affinity for coloring-matters. Another useful application of soluble algin is for preventing boiler incrustation on account of its completely precipitating lime, baryta, and strontia, as well as alumina, and iron from solution in a gelatinous form. Soluble algin can also be combined or mixed with bichromate of potash, the resulting compound being rendered insoluble on exposure to light, so that it can be used for photographic purposes. Finally, instead of treating or applying the alginate of soda in any of the ways hereinbefore described, it may be decomposed by prolonged boiling, so as to yield dextrine and glucose, from which alcohol and acetic acid can be produced; or the dextrine and glucose may be separated by well-known processes.

Having now particularly described and ascertained the nature of my said invention, and in what manner the same is to be performed, I declare that what I claim is—

1. The improved process for obtaining algin from sea-weeds, and consisting, principally, in treating fresh or more or less dried sea-weed directly with solution of carbonate of soda, substantially as hereinbefore described.

2. The process for obtaining useful products from sea-weeds, in which the algin is first separated by treatment with carbonate of soda and precipitation by a suitable acid or salt, and the other constituents are subsequently separated, substantially as hereinbefore described.

3. The process herein described of preparing alginates by means of a double decomposition of alginate of soda with metallic or other salts, substantially as hereinbefore described.

4. The process herein described of mixing a soluble alginate with an ammoniacal solution of shellac, substantially as hereinbefore described.

5. The process herein described of treating sea-weed, which consists in first mixing the sea-weed with solution of carbonate of soda and boiling the mixture to produce a cellulose residue, in then treating the solution with sulphuric acid, producing alginic acid as a precipitate, in then neutralizing the remaining solution with alkaline earth, producing a precipitate of sulphate of lime, in then evaporating the remaining solution to a density at which sulphate of soda crystallizes out as Glauber's salt, and in finally evaporating the mother-liquor to dryness and carbonizing the residue, forming kelp substitute, all as specified.

6. The process described, which consists in the employment of hydrochloric acid for the precipitation of the alginic acid, and in neutralizing the solution with carbonate of soda and boiling the whole down to dryness, and carbonizing the residue to form the kelp substitute.

The foregoing specification of my improvements in the manufacture of algin and other useful products from seaweed signed by me this 15th day of December, 1885.

EDWARD CHARLES CORTIS STANFORD.

Witnesses:
JOHN J. LOVE,
Of 183 West George St., Glasgow, Law Clerk.
JOHN BLYTH,
Of 183 West George St., Glasgow, Law Apprentice.